B. E. D. STAFFORD.
STAY BOLT CONNECTION FOR BOILERS.
APPLICATION FILED NOV. 6, 1915.
1,244,916.
Patented Oct. 30, 1917.
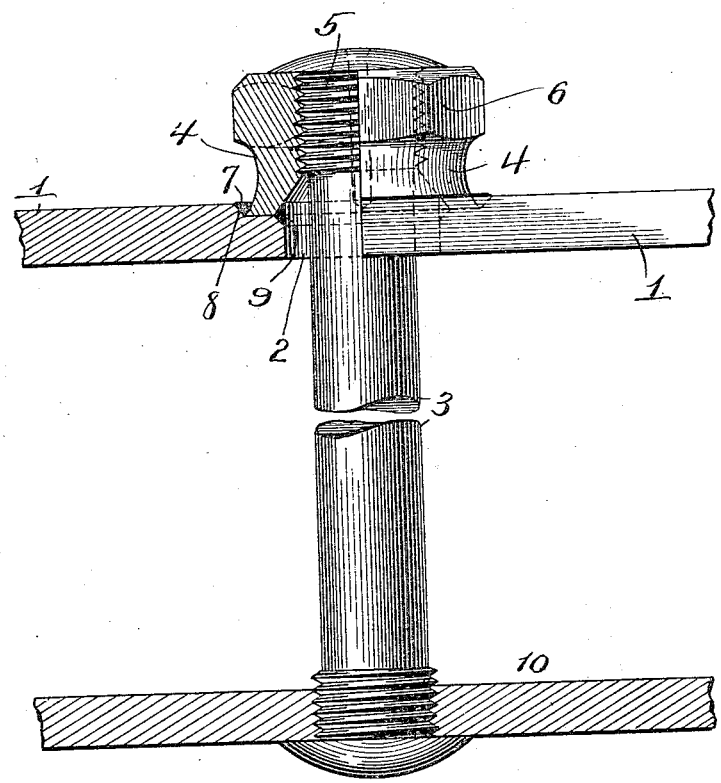

UNITED STATES PATENT OFFICE.

BENJAMIN E. D. STAFFORD, OF PITTSBURGH, PENNSYLVANIA, ASSIGNOR TO FLANNERY BOLT COMPANY, OF PITTSBURGH, PENNSYLVANIA.

STAY-BOLT CONNECTION FOR BOILERS.

1,244,916.   Specification of Letters Patent.   Patented Oct. 30, 1917.

Application filed November 6, 1915. Serial No. 60,050.

*To all whom it may concern:*

Be it known that I, BENJAMIN E. D. STAFFORD, a citizen of the United States, and a resident of Pittsburgh, in the county of Allegheny and State of Pennsylvania, have invented certain new and useful Improvements in Stay-Bolt Connections for Boilers; and I do hereby declare the following to be a full, clear, and exact description of the invention, such as will enable others skilled in the art to which it appertains to make and use the same.

My invention relates to improvements in stay bolt connection for boilers, and is designed particularly for use with bolts long enough to be sufficiently yielding to accommodate themselves to the unequal movements of the two sheets to which the bolt is attached.

My application No. 61,758 filed November 16, 1915, discloses a bolt with a spherical head mounted for universal movements in a sleeve secured against the outer face of the boiler roof plate by welding.

This invention consists in a roof plate having an opening for the passage of the stay bolt, a counterbore around said opening forming a depressed seat for a sleeve, a sleeve seated in said counterbore and secured therein by welding and a stay bolt having screw threaded attachment with the sleeve.

The accompanying drawing is a view partly in section and partly in elevation of my improvement.

1 represents the roof plate or sheet of a locomotive boiler provided with an opening 2 for each stay bolt, the said opening being slightly larger than the shank 3 of the bolt so as to permit of relatively free bending movement of the shank in said opening.

The plate 1 is counterbored on its outer surface around the opening 2, to receive and form a seat for the end of the sleeve 4, the said end of the sleeve being machined off to make a close fit, and also to bring the axis of the sleeve into alinement with the axis of the bolt which connects the roof and crown sheets of the boiler.

The sleeve 4 is provided with internal threads for the attachment of the threaded end 5 of the bolt 3, and exteriorly with an angular surface for the attachment of a wrench used for steadying the sleeve while screwing the stay bolt therein. The inner end of the sleeve is preferably made to flare outwardly as shown, so that after it has been welded to the sheet or plate 1, the metal of the sleeve will underlie the metal of the weld and thus lock the sleeve solidly in place.

In assembling the parts, the sleeves are properly placed with relation to the bolt openings in the plate, after which the welding composition or filler is applied at the outside, as at 7, between the sleeve and the shoulder 8 formed by counterboring the plate 1, and also preferably at the inside, at the juncture of the sleeve and plate, as at 9, after which the weld is effected by the oxy-acetylene welding process, or by electrically welding the parts. The welding fuses the metal so that the union between the plate and the sleeve is of a homogeneous character, whereby all of the advantages of a sleeve integral with the plate are obtained.

The head, or threaded end of the bolt 3 is then screwed into the sleeve 4 and the opposite end screwed into the crown sheet 10, and is secured in both by upsetting or riveting over the ends of the bolt as shown.

This improvement is especially adapted for bolts that are long enough to be sufficiently yielding to accommodate themselves to the unequal movements of the two sheets. It provides a solid base for the sleeve, which will take the shock of riveting up, and it permits of the use of a heavier and thicker sleeve. The thickness of the sleeve is determined by the size of the holes in the sheet, hence by making the holes smaller, as they are where the sleeve rests on the plate instead of passing into the hole in the plate, the sleeves can be made considerably heavier than those now in use, and consequently not so liable to be injured while upsetting the outer end of the bolt, or later on in testing the bolt, which is usually done by striking it with a hammer.

The sleeve can be machined off to the desired angle to conform to the angle of stay bolt installation, and can be used on flat or curved plates whenever necessary.

It is evident that changes in the construction and relative arrangement of the several parts might be made without avoiding my invention and hence I would have it understood that I do not restrict myself to the particular construction and arrangement of parts shown and described, except as required by the scope of the appended claims.

Having fully described my invention what I claim as new and desire to secure by Letters-Patent, is:

1. In stay bolt connection for boilers, the combination of a boiler plate having an opening for the passage of a bolt, a sleeve bearing against the outer face of said plate around the opening therein and secured to said plate by welding, and a stay bolt having a screw threaded connection with said sleeve.

2. In a stay bolt connection for a boiler, the combination of a boiler plate having an opening for the passage of a stay bolt, and a counterbore around said opening, a sleeve seated on said plate within the counterbore and secured therein by welding and a bolt having a threaded connection with the sleeve.

In testimony whereof, I have signed this specification in the presence of two subscribing witnesses.

BENJAMIN E. D. STAFFORD.

Witnesses:
EDWIN S. RYCE,
F. H. ALLISON.

Copies of this patent may be obtained for five cents each, by addressing the "Commissioner of Patents, Washington, D. C."